Feb. 3, 1970    S. UNTERMYER II    3,493,792
CONTROLLING CESIUM RESERVOIR TEMPERATURE FOR
THERMIONIC CONVERTERS
Filed April 1, 1969
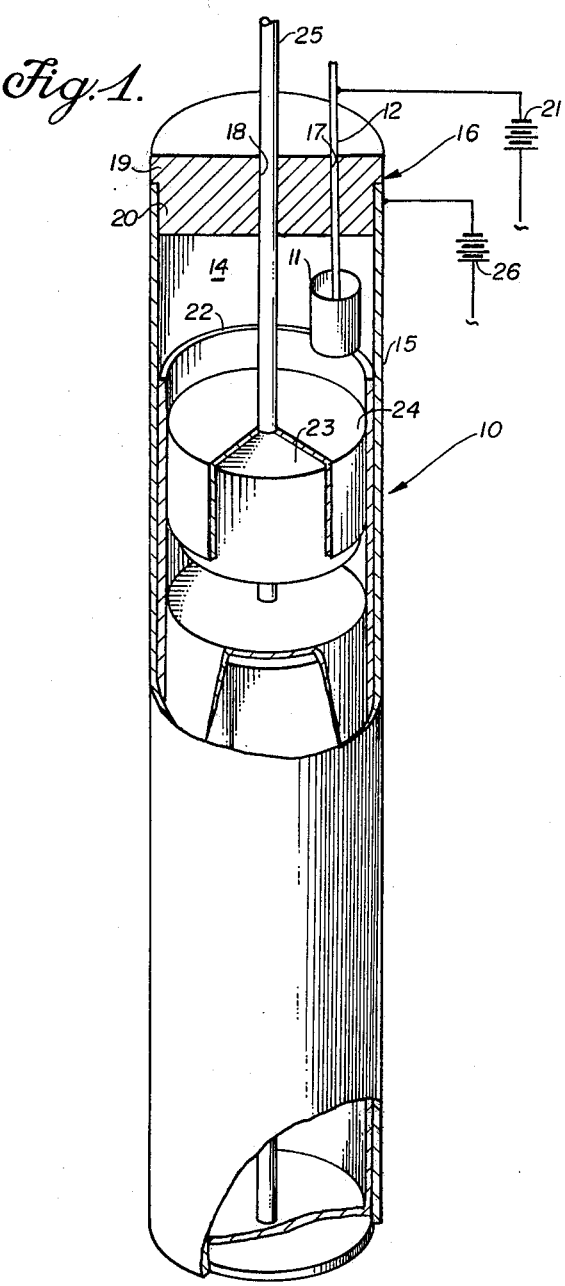
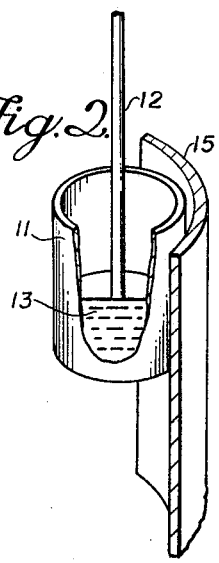
INVENTOR.
SAMUEL UNTERMYER II
BY
ATTORNEY

United States Patent Office 3,493,792
Patented Feb. 3, 1970

3,493,792
CONTROLLING CESIUM RESERVOIR TEMPERATURE FOR THERMIONIC CONVERTERS
Samuel Untermyer II, Portola Valley, Calif., assignor to the United States of America as represented by the United States Atomic Energy Commission
Filed Apr. 1, 1969, Ser. No. 811,903
Int. Cl. H02n 3/00
U.S. Cl. 310—4                                    3 Claims

ABSTRACT OF THE DISCLOSURE

A thermionic converter composed of a thermionic unit or diode with cesium vapor and containing a cesium reservoir, wherein the cesium reservoir temperature is controlled by applying a voltage to the reservoir, causing electric current to flow to or from the reservoir, thereby providing electron heating or cooling of the cesium, thus controlling the cesium pressure within the unit or diode to obtain maximum thermionic output.

BACKGROUND OF THE INVENTION

The invention described herein was made in the course of, or under, Contract No. AT(04–3)–189, Project Agreement No. 32, with the United States Atomic Energy Commission.

This invention relates to thermionic converters, and more particularly to a means for controlling the temperature of the plasma reservoir of a thermionic converter.

Precise temperature control in a simple and convenient manner is of increasing importance in the utilization of electronic devices such as thermionic converters. In such devices it is important that a uniform temperature be maintained independent of variations in ambient temperature, pressure, or acceleration due to gravity. Generally, in the past, these devices have utilized a separately located plasma reservoir with heating and cooling arrangements therefor to maintain the plasma at a constant temperature. Much effort has been directed to developing more effective methods and apparatus for controlling the temperature of a plasma reservoir. U.S. Patent No. 3,303,361 to W. R. Martini is exemplary of the prior efforts in this field.

The plasma (for example, cesium) reservoir of a thermionic converter normally operates at about 630° K., whereas the collector and coolant should operate at higher temperatures for best efficiency and improved heat rejection. Thus in a compact system, where thermionic fuel is immersed in hot, liquid metal coolant, there may be difficulty in establishing the proper reservoir temperature, since this temperature is generally lower than that of the coolant. As pointed out above, the usual practice in this art has been to put the reservoir in a cooler region, outside the coolant, connected with the thermionic fuel element (TFE) by tubing. The temperature of the reservoir may then be adjusted by electric heating coils. This introduces two complications:

(1) The reservoir must be connected by relatively fragile tubes; failure of the tubes causes failure of the TFE.

(2) The tubes must be heated to higher than reservoir temperature, otherwise secondary "reservoirs" will be formed in the tube and these may operate at unknown and unsatisfactory temperatures.

SUMMARY OF THE INVENTION

The present invention overcomes the above mentioned complications of the prior devices by locating the reservoir in the body of the thermionic fuel element (TFE) and uses electron cooling or heating to control the temperature of the reservoir.

Therefore, it is an object of this invention to provide a means for controlling cesium reservoir temperature for thermionic converters.

A further object of the invention is to provide a means to control the temperature of a plasma reservoir of a thermionic fuel element.

Another object of the invention is to provide electron cooling or heating to control the temperature of a cesium reservoir of a thermionic converter.

Another object of the invention is to provide a temperature control for a cesium reservoir wherein heating and cooling thereof is achieved by applying an appropriate voltage to either cause electrons to flow from the reservoir to the sheath of a thermionic converter containing the reservoir or from the sheath to the reservoir.

Other objects of the invention will become readily apparent to those skilled in the art from the following description and accompanying drawings.

BRIEF DESCRIPTION OF THE DRAWINGS

FIG. 1 is a view, partially in cross-section, of a thermionic converter incorporating the invention; and FIG. 2 is an enlarged view of the reservior of the reservoir of the FIG. 1 converter shown partially cut-away and adjacent one surface of the converter sheath.

DESCRIPTION OF THE INVENTION

As pointed out above, the invention uses electron cooling or heating to control the temperature of a plasma reservoir for a thermionic converter, the plasma described herein being cesium. Since either cooling or heating of the reservoir is available, it is located where most convenient in the body of a thermionic converter, for example, a thermionic fuel element (TFE), as shown in the drawings.

Referring now to the drawings, the TFE generally indicated at 10 is provided with a reservoir 11 consisting of a small receptacle or container (about 1 cc.) connected to an electric lead 12 and containing cesium (Cs) indicated at 13 (see FIG. 2). The reservoir 11 is located in cesium vapor indicated at 14 contained within a sheath tube or casing 15 of the TFE 10, the reservoir being positioned close to the internal surface of the sheath tube 15 for purposes described hereinafter. The open (upper) end of sheath tube or casing 15 is closed by a seal insulator 16 having apertures 17 and 18 extending therethrough. Insulator 16 includes a rim or flange portion 19 which extends over the end of sheath tube 15 and a reduced diameter portion 20 which fits within the internal surface of the sheath, thereby providing a vapor tight seal therebetween to prevent leakage of cesium vapor 14 from within sheath tube 15. The insulator 16 may be secured in sheath tube or casing 15 in any manner known in the art. The electrical lead 12 of reservoir 11 extends through aperture 17 in seal insulator 16 and is sealed therein to prevent leakage of cesium vapor thereabout, lead 12 being operatively connected to a power source shown schematically at 21.

The details of the components within the sheath tube 15 do not constitute part of this invention and thus not described in detail, but consist of sheath insulator 22 which covers the entire internal surface of sheath tube 15 except the upper end portion thereof in the area of the reservoir 11, thus defining a chamber-like area. A plurality of thermionic units, such as diodes, each comprising an emitter 23 and a collector 24 are serially mounted within sheath insulator 22 as known in the art, the upper collector 24 being operably connected to a TFE lead 25 which extends through and sealed in aperture 18 of seal insulator 16 for connection to a point of use.

Casing or sheath tube 15 is operably connected to a power source indicated schematically at 26. Power sources 21 and 26 have controls, not shown, for varying the voltage therefrom as described hereinbelow. Also power sources 21 and 26 may be combined into one with appropriate controls to the reservoir and casing. It is thus seen that during operation of the inventive temperature control of the reservoir 11, the casing or receptacle defining the reservoir functions as one electrode while the sheath tube or casing 15 serves as the second electrode. Thus when the reservoir voltage is made higher than the sheath tube voltage via power source 21 and lead 12 current flows from the sheath tube to the reservoir, heating the reservoir. When the sheath tube voltage is made higher via power source 26, current flows from the reservoir to the sheath tube cooling the reservoir and heating the sheath tube, the latter being the more normal mode of operation.

With a reservoir of about 1 cc., heating or cooling amounts to about 2.5 watts/ampere. The principal heat transfer from the reservoir is that due to vapor conduction by cesium. Radiation losses are low because of small temperature differences, low temperature and low emissivity. Conduction by lead-support can be made very small. At a temperature differential of 300° C., cesium conduction should be about ½ watt per cm.$^2$ across a 40 mil gap. Thus only about 2 watts would be needed for a typical reservoir, having an area of 2 cm.$^2$. This cooling could be obtained with a current of about 1 ampere or 500 milliamperes per square centimeter. If a potential of 4 volts is used, the parasitic power required is only 2 watts, or less than 0.2% of the typical output from a TFE. To obtain back-emission currents of milliamperes, it is desirable to operate the reservoir in the reverse arc mode. Under these conditions, current is a rapid function of voltage and of reservoir temperature, so that temperature control is simple by adjusting applied voltage. If the temperature should fall, the current tends to shut off, providing a degree of inherent self-regulation.

It has thus been shown that the present invention provides a simple and effective manner of controlling the temperature of the cesium reservoir of a thermionic converter. Thus, the cesium pressure within the converter may be controlled to obtain maximum thermionic output; heating to increase pressure; cooling to reduce pressure.

While a particular embodiment of the invention has been illustrated and described, modification and changes will be apparent to those skilled in the art, and it is intended to cover in the appended claims all such modification and changes as come with the spirit and scope of the invention.

What I claim is:
1. A temperature controlling device for a cesium reservoir of a thermionic converter comprising: a thermionic converter having a casing, said casing being adapted to be connected to an associated electrical power supply, insulator means sealingly secured in one end of said casing, at least one thermionic unit operatively positioned within said casing in spaced relationship with said insulator means, said casing being adapted to contain cesium in a vapor state in at least the chamber-like portion thereof intermediate said thermionic unit and said insulator means, said thermionic unit having an output lead means extending in sealing relationship through said insulator means, a receptacle defining a reservoir positioned in said chamber-like portion and adapted to contain cesium therein, said receptacle being operatively connected to an electrical lead extending in sealed relationship through said insulator means, said electrical lead being adapted to be connected to an associated electrical power supply, said receptacle having a small cross-sectional area compared to the cross-sectional area of said casing, said receptacle being positioned near and in spaced relationship with an internal surface area of said casing, whereby supplying a voltage from an associated power supply to the receptacle which is higher than the voltage supplied to said casing causes current to flow from said casing to said receptacle thereby heating said receptacle, and supplying a higher voltage to said casing than the voltage supplied to said receptacle causes current to flow from said receptacle to said casing thereby cooling said receptacle.

2. The temperature controlling device defined in claim 1, wherein said thermionic unit consists of an emitter and a collector, said collector being connected said output lead means, and an insulating means position intermediate said thermionic unit and said casing.

3. The temperature controlling device defined in claim 2, including a plurality of thermionic units connected in series within said casing, the collector of one of said units being operatively connected to the emitter of an adjacent unit in said series, said insulating means separating each of said units from said casing.

References Cited

UNITED STATES PATENTS

| 3,144,569 | 8/1964 | Coles | 313—180 X |
| 3,176,216 | 3/1965 | Drenning et al. | 313—180 X |
| 3,303,361 | 2/1967 | Martini | 310—4 |
| 3,353,037 | 11/1967 | Jester et al. | 310—4 |
| 3,366,820 | 1/1968 | Wolfe | 313—180 X |

D. F. DUGGAN, Primary Examiner

U.S. Cl. X.R.

313—180